(12) United States Patent
Watanabe et al.

(10) Patent No.: US 9,453,440 B2
(45) Date of Patent: Sep. 27, 2016

(54) OIL PUMP FOR INTERNAL COMBUSTION ENGINE, AND RELIEF PRESSURE CONTROL APPARATUS FOR OIL PUMP

(71) Applicant: HITACHI AUTOMOTIVE SYSTEMS, LTD., Hitachinaka-shi, Ibaraki (JP)

(72) Inventors: Yasushi Watanabe, Kanagawa (JP); Hideaki Ohnishi, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/516,952

(22) Filed: Oct. 17, 2014

(65) Prior Publication Data

US 2015/0107686 A1    Apr. 23, 2015

(30) Foreign Application Priority Data

Oct. 18, 2013    (JP) .................................. 2013-217150

(51) Int. Cl.
*F16K 31/12* (2006.01)
*F01M 1/16* (2006.01)
*G05D 16/20* (2006.01)

(52) U.S. Cl.
CPC ............ *F01M 1/16* (2013.01); *G05D 16/2026* (2013.01); *G05D 16/2093* (2013.01); *Y10T 137/2544* (2015.04)

(58) Field of Classification Search
CPC .............. F01M 1/16; G05D 16/2093; G05D 16/2026; Y10T 137/2544; F16K 17/0446; F16K 17/04; F16K 17/0473
USPC ............ 137/487.5, 596.16; 251/30.01, 30.02
See application file for complete search history.

(56) References Cited

U.S. PATENT DOCUMENTS

| 4,657,041 A * | 4/1987 | Mitsui ................ G05D 16/2093 |
| | | 137/116.3 |
| 5,913,577 A * | 6/1999 | Arndt .................... B60T 15/028 |
| | | 137/625.64 |
| 2012/0055442 A1* | 3/2012 | Morinaka ............... F04C 14/26 |
| | | 123/196 R |
| 2013/0343937 A1* | 12/2013 | Williamson ............. F01M 1/16 |
| | | 417/447 |

FOREIGN PATENT DOCUMENTS

WO    WO 2012/100344 A1    8/2012

\* cited by examiner

*Primary Examiner* — John K Fristoe, Jr.
*Assistant Examiner* — Umashankar Venkatesan
(74) *Attorney, Agent, or Firm* — Foley & Lardner LLP

(57) ABSTRACT

An oil pump includes a relief valve. The relief valve adjusts a pump discharge pressure depending on a differential pressure between the pump discharge pressure and a back pressure chamber pressure. An electromagnetic switching valve includes a movable member moved electromagnetically. The movable member brings a ball valve element selectively into a state pressed onto a valve seat portion, to selectively close and open an oil passage. The electromagnetic switching valve selectively supplies the pump discharge pressure to a back pressure chamber of the relief valve and drains the back pressure chamber of the relief valve by selectively opening and closing the oil passage. A pilot valve is disposed downstream of the electromagnetic switching valve, and operates upon receipt of the pump discharge pressure or the back pressure chamber pressure, and controls an oil pressure supplied to the back pressure chamber of the relief valve.

14 Claims, 10 Drawing Sheets

OIL PUMP FOR INTERNAL COMBUSTION ENGINE, AND RELIEF PRESSURE CONTROL APPARATUS FOR OIL PUMP

BACKGROUND OF THE INVENTION

The present invention relates to an oil pump for an internal combustion engine, and a relief pressure control apparatus for such an oil pump. For example, the oil pump is configured to supply oil to sliding parts and others of the internal combustion engine which is mounted on an automotive vehicle.

International Application Publication WO 2012/100344 A1 discloses a relief pressure control apparatus for an oil pump for an internal combustion engine, wherein the relief pressure control apparatus is configured to control a pump discharge pressure to a suitable level by relief, when the pump discharge pressure becomes excessively high, for example, when the oil pump is operating at high speed. This relief pressure control apparatus includes a relief valve and a pilot valve. The relief valve is configured to control the pump discharge pressure outputted by the oil pump. The pilot valve is configured to control an internal pressure of a back pressure chamber of the relief valve via a directional switching valve, with receipt of the pump discharge pressure as a pilot signal. The relief valve includes: a housing including a valve accommodation chamber; a valve element slidably mounted in the valve accommodation chamber; and a relief spring configured to bias the valve element in one direction. The pilot valve includes: a supply port for supply the introduced pump discharge pressure to the directional switching valve; and a drain port for draining an oil pressure supplied from the directional switching valve to the supply port. The pilot valve is configured to selectively open and close the drain port depending on the oil pressure. The directional switching valve is configured to implement switching between fluid passages in an on-off manner by moving a valve element forward or rearward, to obtain two different levels of relief pressure.

SUMMARY OF THE INVENTION

The relief pressure control apparatus disclosed in International Application Publication WO 2012/100344 may be confronted by the following problem. In the directional switching valve, both of the oil pressure introduced from the pilot valve and the oil pressure returned from the back pressure chamber are communicated in opposite directions. Accordingly, in a case that the valve element is of a ball-type, when the ball valve element is free from pressing action of a push rod, behavior of the ball valve element may become unstable so that the passage between the supply port and the drain port cannot be correctly opened and closed.

In view of the foregoing, it is desirable to provide an oil pump with a relief pressure control apparatus, which is capable of precisely controlling a relief pressure with stabilized behavior of a valve element of an electromagnetic switching valve even if the valve element is of a ball-type.

According to one aspect of the invention, an oil pump for an internal combustion engine, comprises: a relief valve including a back pressure chamber, and configured to adjust a pump discharge pressure depending on a differential pressure between the pump discharge pressure and a back pressure chamber pressure, wherein the pump discharge pressure is a discharge pressure of the oil pump, and wherein the back pressure chamber pressure is an oil pressure in the back pressure chamber; an electromagnetic switching valve including: an oil passage; a valve seat portion; a ball valve element; and a movable member configured to be moved electromagnetically, and bring the ball valve element selectively into a state pressed onto the valve seat portion and into a state non-pressed onto the valve seat portion, to selectively close and open the oil passage; wherein the electromagnetic switching valve is configured to selectively supply the pump discharge pressure to the back pressure chamber of the relief valve and drain the back pressure chamber of the relief valve by selectively opening and closing the oil passage; and a pilot valve disposed downstream of the electromagnetic switching valve, and configured to operate upon receipt of at least one of the pump discharge pressure and the back pressure chamber pressure, and control an oil pressure supplied to the back pressure chamber of the relief valve. The oil pump may be configured so that: the electromagnetic switching valve is configured to control the back pressure chamber pressure by selectively allowing and preventing fluid communication between a discharge passage and a back pressure passage by operating the ball valve element depending on an operating state of the internal combustion engine; the pump discharge pressure is applied to the discharge passage; and the back pressure passage includes an end open to the back pressure chamber of the relief valve. The oil pump may be configured so that the pilot valve includes: a supply port configured to receive supply of the pump discharge pressure from the discharge passage directly or through the back pressure passage; a discharge port configured to discharge the supplied pump discharge pressure; a cylinder, wherein the supply port includes an end open to the cylinder, and wherein the discharge port includes an end open to the cylinder; a pilot valve element slidably mounted in the cylinder, and including an end portion including a pressure-receiving surface configured to receive the supplied pump discharge pressure, and configured to vary an opening area of the discharge port by sliding in accordance with the supplied pump discharge pressure; and a biasing member configured to bias the pilot valve element in a direction to close the discharge port. The oil pump may be configured so that the pilot valve is configured to vary a cross-sectional area of fluid communication between the supply port and the discharge port by sliding of the pilot valve element. The oil pump may be configured so that the pilot valve is configured to vary a cross-sectional area of fluid communication between the back pressure passage and the discharge port by sliding of the pilot valve element. The oil pump may further comprise an oil filter disposed in a discharge passage and upstream of the relief valve and the electromagnetic switching valve.

According to another aspect of the invention, a relief pressure control apparatus for an oil pump, comprises: a relief valve including: a valve accommodation chamber, wherein an introduction port includes an end open to the valve accommodation chamber, and wherein a drain port includes an end open to the valve accommodation chamber, and wherein the introduction port is configured to introduce a pump discharge pressure through a discharge passage, and wherein the pump discharge pressure is a discharge pressure of the oil pump, and wherein the drain port is configured to drain the introduced pump discharge pressure; a relief valve element slidably mounted in the valve accommodation chamber, and including a first end side configured to receive the pump discharge pressure through the introduction port, and configured to vary an opening area of the drain port by sliding in accordance with the received pump discharge pressure; a biasing member configured to bias the relief valve element in a direction to close the drain port; a back pressure chamber formed in the valve accommodation chamber at a second end side of the relief valve element; and a back pressure passage including an end open to the back pressure chamber; an electromagnetic switching valve hydraulically connected between the discharge passage and the back pressure passage, the electromagnetic switching valve including: an open-ended hole configured to receive supply of the pump discharge pressure from the discharge passage; a back pressure hole configured to supply the pump discharge pressure from the open-ended hole to the back pressure passage; a ball valve element configured to selectively open and close the open-ended hole; and a solenoid configured to operate the ball valve element; and a pilot valve hydraulically connected between the electromagnetic switching valve and the back pressure chamber of the relief valve, and configured to operate upon receipt of at least one of the pump discharge pressure and a back pressure chamber pressure, wherein the back pressure chamber pressure is an oil pressure in the back pressure chamber of the relief valve, and control an oil pressure supplied to the back pressure chamber of the relief valve. The relief pressure control apparatus may be configured so that the electromagnetic switching valve is configured to control the back pressure chamber pressure by selectively allowing and preventing fluid communication between the discharge passage and the back pressure hole by operating the ball valve element depending on an operating state of an internal combustion engine. The relief pressure control apparatus may be configured so that the pilot valve includes: a supply port configured to receive supply of the pump discharge pressure from the discharge passage directly or through the back pressure passage; a discharge port configured to discharge the supplied pump discharge pressure; a cylinder, wherein the supply port includes an end open to the cylinder, and wherein the discharge port includes an end open to the cylinder; a pilot valve element slidably mounted in the cylinder, and including an end portion including a pressure-receiving surface configured to receive the supplied pump discharge pressure, and configured to vary an opening area of the discharge port by sliding in accordance with the supplied pump discharge pressure; and a biasing member configured to bias the pilot valve element in a direction to close the discharge port. The relief pressure control apparatus may be configured so that the pilot valve includes: a supply port configured to receive supply of the pump discharge pressure from the discharge passage directly or through the back pressure passage; a branch port hydraulically connected to the back pressure passage; a discharge port configured to discharge an oil pressure supplied from the branch port; a cylinder, wherein the supply port includes an end open to the cylinder, and wherein the branch port includes an end open to the cylinder, and wherein the discharge port includes an end open to the cylinder; a pilot valve element slidably mounted in the cylinder, and including an end portion including a pressure-receiving surface configured to receive the supplied pump discharge pressure, and configured to vary a cross-sectional area of fluid communication between the branch port and the discharge port by sliding in accordance with the supplied pump discharge pressure; and a biasing member configured to bias the pilot valve element in a direction to close the discharge port. The relief pressure control apparatus may be configured so that: the relief valve element has a cylindrical shape including a bottom including a pressure-receiving surface at a longitudinal end of the relief valve element; and the pressure-receiving surface is applied with the introduced pump discharge pressure. The relief pressure control apparatus may be configured so that: the relief valve element has a cylindrical shape including a bottom; the valve accommodation chamber has a cylindrical shape; the open end of the introduction port is located at a longitudinal end portion of the valve accommodation chamber; and the open end of the drain port and the open end of the back pressure passage are located at a peripheral portion of the valve accommodation chamber, and arranged in a longitudinal direction of the valve accommodation chamber, and formed to extend in a radial direction of the valve accommodation chamber. The relief pressure control apparatus may be configured so that: the pilot valve includes: a supply port configured to receive supply of the pump discharge pressure from the discharge passage directly or through the back pressure passage; a branch port hydraulically connected to the back pressure passage; a discharge port configured to discharge an oil pressure supplied from the branch port; a cylinder, wherein the supply port includes an end open to the cylinder, and wherein the branch port includes an end open to the cylinder, and wherein the discharge port includes an end open to the cylinder; a pilot valve element slidably mounted in the cylinder, and including an end portion including a pressure-receiving surface configured to receive the supplied pump discharge pressure, and configured to vary a cross-sectional area of fluid communication between the branch port and the discharge port by sliding in accordance with the supplied pump discharge pressure; and a biasing member configured to bias the pilot valve element in a direction to close the discharge port; the pilot valve element has a cylindrical shape including a bottom; the cylinder has a cylindrical shape; the open end of the supply port is located at a longitudinal end portion of the cylinder; and the open end of the discharge port and the open end of the branch port are arranged in a longitudinal direction of the cylinder, and formed to extend in a radial direction of the cylinder. The relief pressure control apparatus may be configured so that: the electromagnetic switching valve includes an accommodation part therein; the accommodation part is disposed at a distal end portion of the electromagnetic switching valve, and has a cylindrical shape, and accommodates the ball valve element movably; the open-ended hole is formed in a distal end of the accommodation part in a longitudinal direction of the electromagnetic switching valve; the back pressure hole is disposed at a peripheral portion of the accommodation part, and extends in a radial direction of the accommodation part; the solenoid includes a push rod inserted in the accommodation part; and the push rod is configured to cause the ball valve element to move forward and rearward selectively to selectively close and open the open-ended hole. The relief pressure control apparatus may be configured so that the electromagnetic switching valve is configured to maintain the open-ended hole closed by the ball valve element at start of the oil pump. The relief pressure control apparatus may be configured so that: energization of the solenoid of the electromagnetic switching valve is controlled based on parameters of an internal combustion engine; and the parameters include an oil temperature, a water temperature, a rotational speed, and a load. The relief pressure control apparatus may be configured so that: the electromagnetic switching valve includes a drain hole; the drain hole is located at a portion of the accommodation part opposite to the open-ended hole; and the drain hole is configured to allow fluid communication between the back pressure passage and an outside through the back pressure hole, when the open-ended hole is closed by the ball valve element.

DETAILED DESCRIPTION OF THE INVENTION

Figure 1:
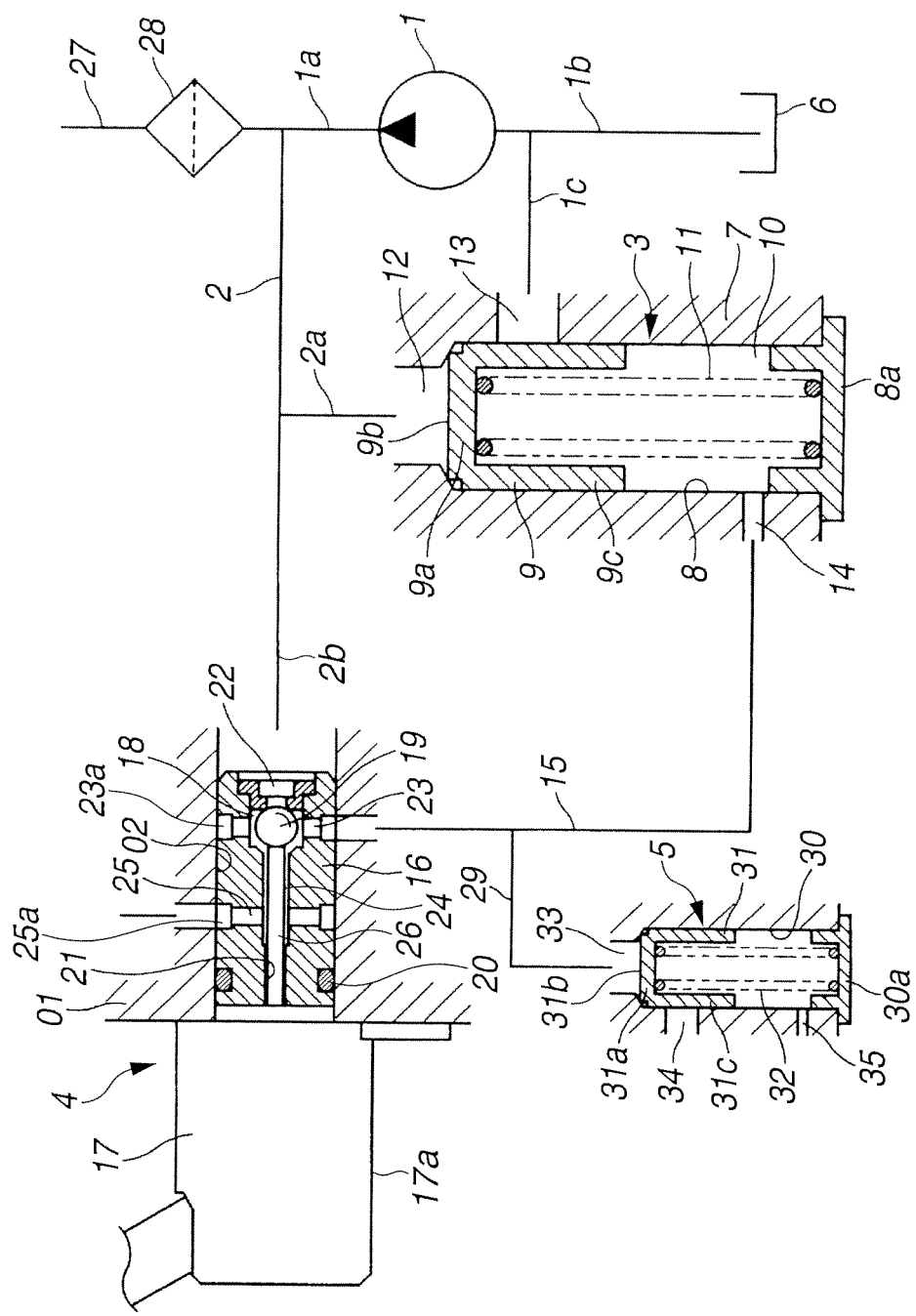
FIG. 1 is a schematic diagram showing an oil pump system including an oil pump and a relief pressure control apparatus according to a first embodiment of the present invention.
Figure 2:
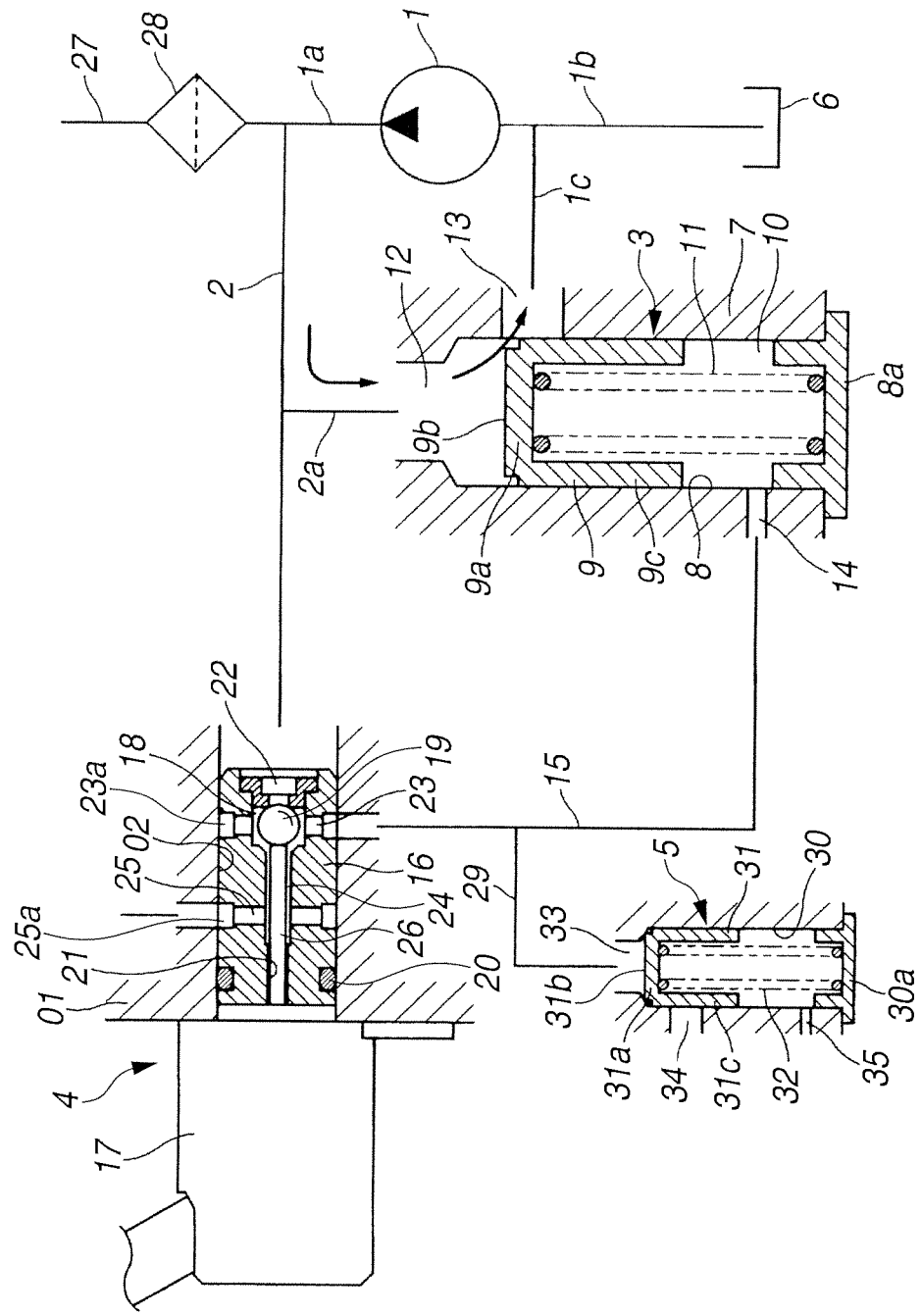
FIG. 2 is a schematic diagram showing the oil pump system of FIG. 1 in a state where an electromagnetic switching valve is energized.

In each present embodiment, an oil pump is embodied as one serving as a power source for a variable timing control (VTC) device for varying opening and closing timings of engine valves of an internal combustion engine of an automotive vehicle, or serving to supply lubricating oil to sliding parts of the internal combustion engine, specifically to supply lubricating oil to sliding part between each piston and the corresponding cylinder bore by oil jet, or serving to supply lubricating oil to bearings of a crankshaft of the internal combustion engine.

First Embodiment

As shown in FIGS. 1 to 4, an oil pump system including an oil pump 1 of a trochoid type and a relief pressure control apparatus according to a first embodiment of the present invention includes a relief valve 3, an electromagnetic switching valve 4, and a pilot valve 5. Relief valve 3 is disposed in a branch passage 2 branched from a discharge passage 1a of oil pump 1, and is configured to adjust a pump discharge pressure of oil pump 1. Electromagnetic switching valve 4 is configured to be controlled to selectively supply the pump discharge pressure to a back pressure chamber 10 of relief valve 3, and prevent the pump discharge pressure from being supplied to back pressure chamber 10. Pilot valve 5 is hydraulically connected between back pressure chamber 10 of relief valve 3 and electromagnetic switching valve 4, and configured to receive supply of the pump discharge pressure via the electromagnetic switching valve 4, and control an oil pressure supplied to back pressure chamber 10.

Oil pump 1 includes a housing, a pump shaft, an inner rotor, and an outer rotor. The housing is attached to a cylinder block 01 of an internal combustion engine. The pump shaft is rotatably inserted in the housing, and configured to receive input of a torque from a crankshaft of the internal combustion engine. The inner rotor is fixed to an outer periphery of the pump shaft by press-fitting or the like, and includes external teeth of a trochoid type. The outer rotor is disposed outside of the inner rotor, and meshes with the inner rotor by internal teeth of a trochoid type, wherein the number of the teeth of the outer rotor is greater by one than that of the inner rotor.

Oil pump 1 is configured to allow the pump shaft to be rotated by rotational drive of the crankshaft, and thereby suck lubricating oil from an oil pan 6 through a suction passage 1b and an internal suction port, and discharge the lubricating oil through an internal discharge port to discharge passage 1a. The lubricating oil is then supplied through a main oil gallery 27 to sliding parts of the internal combustion engine and the VTC device and others. An oil filter 28 is disposed at a portion of main oil gallery 27 dose to discharge passage 1a.

Relief valve 3 includes a valve accommodation chamber 8, a relief valve element 9, a back pressure chamber 10, and a valve spring 11. Valve accommodation chamber 8 is formed in a casing 7, and has a cylindrical shape whose bottom opening is closed by a plug 8a. Relief valve element 9 is slidably mounted in valve accommodation chamber 8. Back pressure chamber 10 is defined in a lower part of the internal space of valve accommodation chamber 8. Valve spring 11 is mounted in back pressure chamber 10, and is configured to serve as a biasing member to bias the relief valve element 9 upward away from plug 8a.

Valve accommodation chamber 8 is formed with an introduction port 12, a relief port 13, and a back pressure port 14. Introduction port 12 is located at an upper end portion of valve accommodation chamber 8, and is hydraulically connected to a downstream end of a feedback passage 2a branched from branch passage 2. Relief port 13 is located at a peripheral portion of valve accommodation chamber 8 and closer to the upper end portion of valve accommodation chamber 8, and is hydraulically connected to an upstream end of a relief passage 1c hydraulically connected to suction passage 1b. Back pressure port 14 is located at a lower end portion of valve accommodation chamber 8, and is hydraulically connected to back pressure chamber 10.

Relief valve element 9 has a cylindrical shape including a bottom. Specifically, relief valve element 9 includes an upper wall 9a having a disc-shape. The upper wall 9a includes an upper surface including a pressure-receiving surface 9b configured to receive the pump discharge pressure through the introduction port 12. As a peripheral wall 9c of relief valve element 9 having a cylindrical shape slides on an inner peripheral surface of valve accommodation chamber 8, the opening area of relief port 13 changes.

Valve spring 11 is configured to constantly bias the relief valve element 9 upward by an elastic force, and thereby bias the relief valve element 9 in a direction to close the open end of relief port 13 by the outer peripheral surface of peripheral wall 9c.

Back pressure port 14 has an upstream end hydraulically connected to a downstream end of back pressure passage 15 hydraulically connected to electromagnetic switching valve 4, and is constantly open to back pressure chamber 10 even when relief valve element 9 is moved downward maximally.

Electromagnetic switching valve 4 includes a valve body 16, a solenoid part 17, and a ball valve element 19. Valve body 16 has a cylindrical shape, and is inserted and fixed in a valve hole 02 formed in cylinder block 01. Solenoid part 17 is disposed at a rear end of valve body 16. Ball valve element 19 is movably mounted in a valve accommodation part 18 formed in valve body 16 and at a distal end of valve body 16.

Valve body 16 is hermetically sealed and held in valve hole 02 by a seal ring 20 that is fitted and fixed to an outer periphery of a rear end portion of valve body 16. Valve body 16 is formed with a rod insertion hole 21 that extends in the longitudinal direction of valve body 16, and has a distal end facing the valve accommodation part 18. The distal end portion of valve body 16 is formed with an open-ended hole 22 which allows fluid communication between valve accommodation part 18 and branch port 2b of branch passage 2, and extends through in the longitudinal direction of valve body 16. The open-ended hole 22 has a stepped shape having a small diameter portion inside thereof, and the periphery of open-ended hole 22 serves as an annular seat portion configured to be in contact or out of contact with ball valve element 19.

The peripheral wall of the distal end portion of valve body 16 is formed with a plurality of back pressure holes 23 that extend radially of valve body 16, and allow fluid communication between valve accommodation part 18 and back pressure passage 15 through an annular groove 23a.

Valve body 16 is formed with a plurality of drain holes 25, wherein each drain hole 25 extends radially of valve body 16, and is hydraulically connected to valve accommodation part 18 via a tubular passage 24 formed in part of rod insertion hole 21. Each drain hole 25 is hydraulically connected to oil pan 6 via a groove 25a.

Valve accommodation part 18 has a cylindrical shape having a small diameter and extending in the longitudinal direction of valve body 16, and is configured to allow ball valve element 19 to move in valve accommodation part 18 in the longitudinal direction of valve accommodation part 18.

Solenoid part 17 includes a cylindrical case 17a which accommodates an electromagnetic coil, a fixed iron core, a movable plunger, and other components. The movable plunger has a distal end fixed to a proximal end of push rod 26 that is a movable member configured to slide in rod insertion hole 21. Push rod 26 has a distal end pressed onto ball valve element 19 in the longitudinal direction, or released from the pressing.

When the electromagnetic coil of electromagnetic switching valve 4 is energized (or turned on) by a control unit not shown, push rod 26 is caused by the movable plunger to move forward to press the ball valve element 19. This action causes ball valve element 19 to be in pressing contact with the annular seat portion, and thereby close the open-ended hole 22, and simultaneously allows fluid communication between back pressure holes 23 and drain hole 25 through tubular passage 24.

On the other hand, when the energization to the electromagnetic coil of electromagnetic switching valve 4 is cut off, the movable plunger causes ball valve element 19 to move rearward by a return spring mounted in the movable plunger. This action causes ball valve element 19 to open the open-ended hole 22, and simultaneously close the end of tubular passage 24 by the pump discharge pressure introduced through the open-ended hole 22. Accordingly, fluid communication between open-ended hole 22 and back pressure holes 23 is allowed through the valve accommodation part 18, whereas fluid communication between valve accommodation part 18 and drain hole 25 is prevented.

The control unit is configured to selectively energize and de-energize the electromagnetic coil of electromagnetic switching valve 4 based on a sensed state of operation of the internal combustion engine which includes parameters including an oil temperature, a water temperature, an engine rotational speed, an engine load, etc. In the present example, the energization/de-energization of the electromagnetic coil is controlled mainly based on the engine rotational speed.

Pilot valve 5 has a similar configuration as relief valve 3. Specifically, pilot valve 5 includes a cylinder 30, a pilot valve element 31, and a valve spring 32. Cylinder 30 is formed in casing 7, and has a cylindrical shape whose bottom opening is closed by a plug 30a. Pilot valve element 31 is slidably mounted in cylinder 30. Valve spring 32 is mounted in cylinder 30, and is configured to serve as a biasing member to bias the pilot valve element 31 upward away from plug 30a.

Cylinder 30 is formed with a supply port 33, a discharge port 34, and a breather port 35. Supply port 33 is located at a top end portion of cylinder 30, and is hydraulically connected to a downstream end of a signal passage 29 branched from back pressure passage 15. Discharge port 34 is located at a peripheral portion of an upper side portion of cylinder 30, and is hydraulically connected to suction passage 1b. Breather port 35 is located at a peripheral portion of a lower side portion of cylinder 30, and is constantly hydraulically connected to the outside air, to ensure smooth sliding of pilot valve element 31. Alternatively, breather port 35 may be formed in plug 30a.

Pilot valve element 31 has a cylindrical shape including a bottom. Specifically, pilot valve element 31 includes an upper wall 31a having a disc shape. The upper wall 31a includes an upper surface including a pressure-receiving surface 31b configured to receive supply of the pump discharge pressure through the signal passage 29. As a peripheral wall 31c of pilot valve element 31 having a cylindrical shape slides on an inner peripheral surface of cylinder 30, the opening area of discharge port 34 changes (namely, the cross-sectional area of fluid communication between supply port 33 and discharge port 34 changes).

Figure 5:
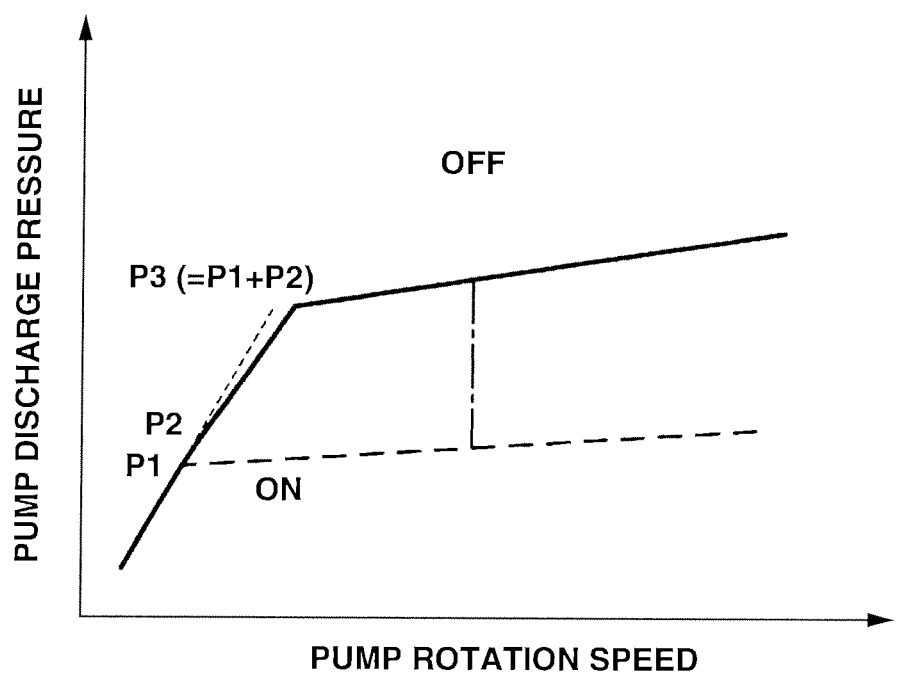
FIG. 5 is a characteristic diagram showing a relationship between a pump discharge pressure and a pump rotational speed (or engine rotational speed) in the oil system of FIG. 1.

Valve spring 32 is configured to bias the pilot valve element 31 upward by an elastic force, and thereby bias the pilot valve element 31 in a direction to close the opening of discharge port 34 by the outer peripheral surface of peripheral wall 31c. The elastic force of valve spring 32 is set such that when the pump discharge pressure equal to a second oil pressure value P2 as shown in FIG. 5 is applied from supply port 33 to pilot valve element 31, pilot valve element 31 is moved to a position to allow fluid communication between supply port 33 and discharge port 34.

<Operation of First Embodiment> The following describes operation of the oil pump with the relief pressure control apparatus described above. When the internal combustion engine is being started or operating at low speed, oil pump 1 is rotated by the internal combustion engine, and the electromagnetic coil of electromagnetic switching valve 4 is energized by the control unit. Accordingly, as shown in FIG. 1, push rod 26 is caused to press ball valve element 19 into pressing contact with the annular seat portion to close the open-ended hole 22, and allow fluid communication between back pressure passage 15 and drain hole 25 through back pressure holes 23 and tubular passage 24. By this action, the internal pressure of back pressure chamber 10 of relief valve 3 is lowered, so that relief valve element 9 is biased toward the maximum upward position in valve accommodation chamber 8 only by the elastic force of valve spring 11, and the upper wall 9a is brought into pressing contact with a stepped annular surface of valve accommodation chamber 8, and the relief port 13 is closed by the peripheral wall 9c of relief valve element 9.

When the engine rotational speed has risen with continuation of the energization of the electromagnetic coil so that the pump discharge pressure has reached a first oil pressure value P1, the pump discharge pressure applied to the pressure-receiving surface 9b of relief valve element 9 has become high and thereby cause relief valve element 9 to move downward by a certain amount against the elastic force of valve spring 11. Under this condition, the outer peripheral surface of peripheral wall 9c of relief valve element 9 gradually increases the opening area of relief port 13 from zero toward the maximum position. By this action, an excess amount of working oil flowing from discharge passage 1a to branch passage 2 is returned to suction passage 1b through feedback passage 2a, introduction port 12 and valve accommodation chamber 8 and relief port 13 of relief valve 3, and relief passage 1c. Accordingly, under that condition, as indicated by a broken line in FIG. 5, the pump discharge pressure is prevented from rising significantly above the first oil pressure value P1, so that the pump discharge pressure is suitably regulated to a substantially flat characteristic. The first oil pressure value P1 is set to satisfy a requested value used to drive the VTC device.

Figure 3:
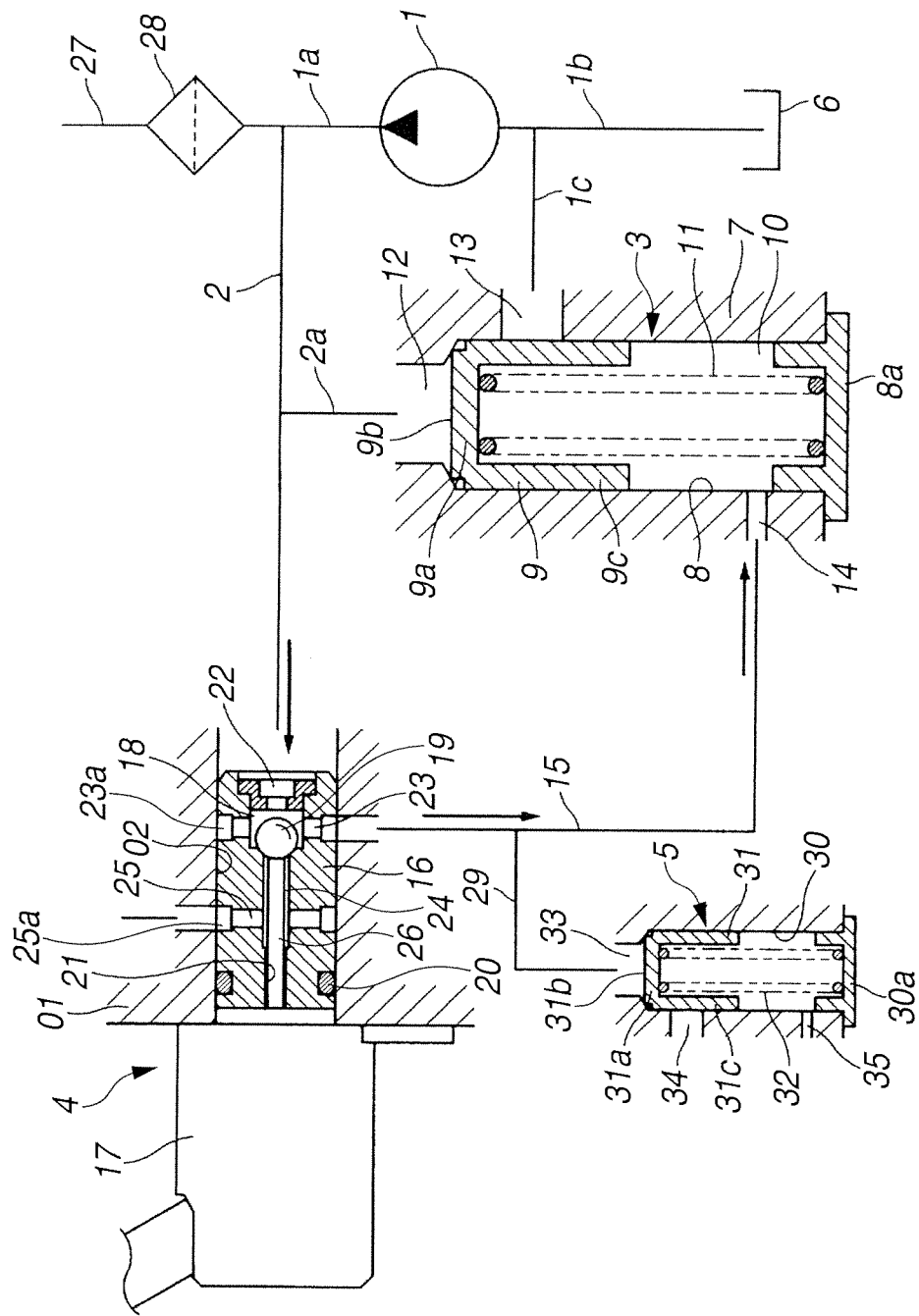
FIG. 3 is a schematic diagram showing the oil pump system of FIG. 1 in a state where the electromagnetic switching valve is de-energized.
Figure 4:
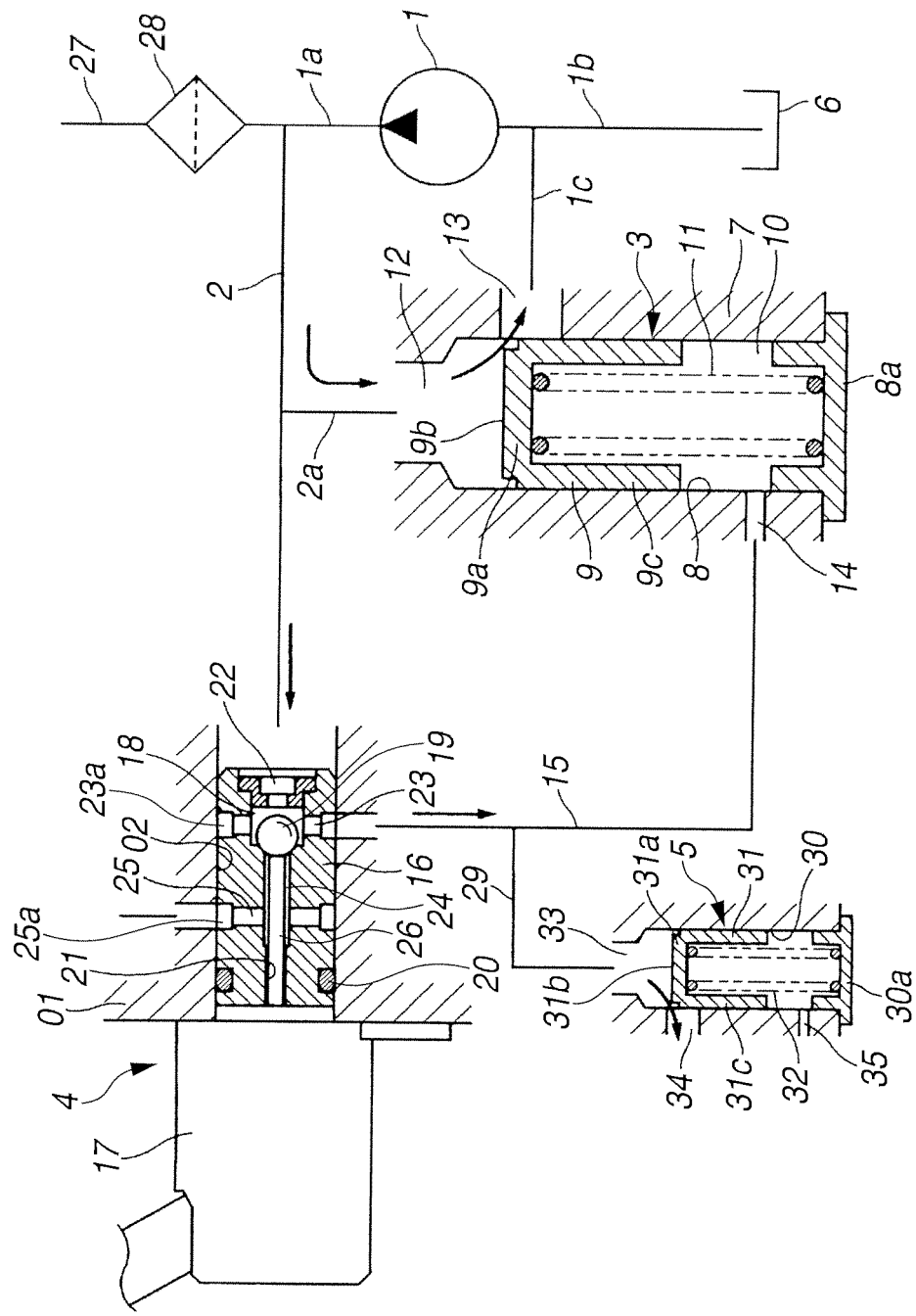
FIG. 4 is a schematic diagram showing the oil pump system of FIG. 1 in a state where the electromagnetic switching valve is held de-energized.

When the internal combustion engine shifts thereafter into a state where high oil pressure is requested with increase of the engine speed and oil temperature, the control unit senses this condition, and then de-energizes the electromagnetic coil of electromagnetic switching valve 4. By this action, as shown in FIG. 3, push rod 26 is caused to move rearward along with the movable plunger, to release the pressing contact between ball valve element 19 and the valve seat portion, so that the open-ended hole 22 is opened by ball valve element 19, to allow fluid communication between branch passage 2 and back pressure passage 15, and close the tubular passage 24. Accordingly, the pump discharge pressure is supplied to back pressure chamber 10 of relief valve 3 through branch passage 2 and back pressure passage 15, so that the internal pressure of back pressure chamber 10 becomes high. On the other hand, the pump discharge pressure is applied to pressure-receiving surface 9b of relief valve element 9 through feedback passage 2a and introduction port 12. In this way, relief valve element 9 is applied with substantially identical oil pressures on upper and lower sides. As a result, relief valve element 9 is moved upward by the elastic force of valve spring 11, so that the outer peripheral surface of peripheral wall 9c of relief valve element 9 closes the open end of relief port 13, and the pressure-receiving surface 9b of upper wall 9a of relief valve element 9 closes the open end of introduction port 12.

When the engine speed further rises from that condition, the high pump discharge pressure is supplied to the back pressure chamber 10 with the relief valve element 9 maintained at the maximum top position shown in FIG. 3, so that the pump discharge pressure exceeds the first oil pressure value P1 and reaches the second oil pressure value P2 as shown in FIG. 5.

When the engine speed further rises and the pump discharge pressure exceeds the second oil pressure value P2, the pump discharge pressure is applied to pressure-receiving surface 31b of pilot valve element 31 through signal passage 29 and supply port 33 of pilot valve 5, to cause pilot valve element 31 to move downward against the elastic force of valve spring 32. This action allows fluid communication between supply port 33 and discharge port 34, and thereby causes the working oil to be drained from back pressure passage 15 to the outside, and thereby adjusts the internal pressure of back pressure chamber 10 of relief valve 3. When discharge port 34 is closed by pilot valve element 31 by the elastic force of valve spring 32, the oil pressures in the upstream side and downstream side of electromagnetic switching valve 4 become equal to each other. However, when discharge port 34 is opened by pilot valve element 31 by the pump discharge pressure at the second oil pressure value P2, the oil pressure is drained from discharge port 34 so that the oil pressure in back pressure passage 15 is reduced by a pressure loss due to a flow resistance in electromagnetic switching valve 4, for example, at open-ended hole 22. The amount of oil drained from discharge port 34 is small so that the gradient of rise of the pump discharge pressure with respect to rise of the rotational speed is slightly reduced or substantially equal to the gradient to the second oil pressure value P2.

In this way, pilot valve 5 adjusts the oil pressure in a portion of the back pressure passage 15 downstream of electromagnetic switching valve 4 (identical to the back pressure of relief valve 3) to the second oil pressure value P2. Accordingly, this oil pressure is applied in addition to the elastic force of valve spring 11 of relief valve 3, so that when the pump discharge pressure at open-ended hole 22 reaches a third oil pressure value P3 (=P1+P2), the oil pump system is in the state shown in FIG. 4. As a result, the pump discharge pressure has a characteristic that the pump discharge pressure slightly ascends from the point of P3 in FIG. 5.

The third oil pressure value P3 is set to obtain an oil pressure for lubrication of the crankshaft when the engine is operating at high speed, or an oil pressure for injecting an oil jet to the engine piston.

In the present embodiment, the first oil pressure value P1 that is a valve open pressure of relief valve 3 and the second oil pressure value P2 that is a valve open pressure of pilot valve 5 can be changed only by changing the properties of valve spring 11 and valve spring 32. Accordingly, even if the first oil pressure value P1 and second oil pressure value P2 are to be set depending on specifications of the engine, the components of the oil pump system except valve spring 11 and valve spring 32 can be used for different engines. This serves to reduce the manufacturing cost.

When the energization of electromagnetic switching valve 4 is switched from on-state to off-state while the engine speed is increasing, the oil pump system shifts from the characteristic indicated by the broken line to the characteristic indicated by the solid line as indicated by a short dashed long dashed line in FIG. 5.

In this way, according to the present embodiment, it is possible to precisely control the relief pressure of oil pump 1 by exclusive open/close control of open-ended hole 22 and the open end of tubular passage 24 by ball valve element 19 by outputting the on-signal and off-signal from the control unit to electromagnetic switching valve 4 depending on the engine speed.

Especially, the flow of lubricating oil (pump discharge pressure) through the ball valve element 19 is unidirectional from branch passage 2 to back pressure passage 15 without inverse flow from back pressure passage 15 to branch passage 2. Namely, no bidirectional flow is caused in electromagnetic switching valve 4. This serves to stabilize constantly behavior of ball valve element 19 without causing the ball valve element 19 unstable and choking and others. This serves to further precisely control the relief pressure of oil pump 1, and enhance the pumping efficiency.

Although pilot valve 5 has a substantially identical configuration as relief valve 3 in the present embodiment, pilot valve 5 may be implemented by an electromagnetic valve or the like, if pilot valve 5 is configured to relieve the oil pressure in back pressure passage 15 depending on the oil pressure in back pressure passage 15 (the back pressure of relief valve 3).

Second Embodiment

FIGS. 6 to 9 show a second embodiment which differs from the first embodiment mainly in that the arrangement of oil filter 28 is modified, and a relief valve element 40 replaces the relief valve element 9 in relief valve 3, and a pilot valve element 50 replaces the pilot valve element 31 in pilot valve 5, and the flow paths to relief valve 3 and pilot valve 5 are modified.

In the second embodiment, oil filter 28 is located at an upstream portion of discharge passage 1a, and main oil gallery 27 and an upstream end of branch passage 2 is connected to a downstream portion of discharge passage 1a.

Relief valve element 40 is mounted in valve accommodation chamber 8 of relief valve 3 and configured to slide upward and downward in the longitudinal direction of valve accommodation chamber 8. Relief valve element 40 is of a spool-valve type and includes a pressure-receiving part 40a, a valve shaft 40b, a valving part 40c, and an annular passage 40d. Pressure-receiving part 40a has a disc-shape facing the introduction port 12. Valving part 40c has a cylindrical shape having a bottom, and is integrally coupled to pressure-receiving part 40a via valve shaft 40b at the center. Annular passage 40d is formed in the outer periphery of valve shaft 40b. Relief valve element 40 is biased constantly toward introduction port 12 by the elastic force of valve spring 11.

The peripheral portion of the upper side portion of valve accommodation chamber 8 is formed with a downstream portion 41b of a return passage 41 having an upstream portion 41a hydraulically connected to discharge passage 1a, wherein upstream portion 41a is located upstream of oil filter 28. Relief port 13 has an opening on the lower side of downstream portion 41b of return passage 41 in the longitudinal direction of valve accommodation chamber 8, and the opening of relief port 13 is hydraulically connected to relief passage 1c.

The downstream portion 41b of return passage 41 constantly faces annular passage 40d over a predetermined range of sliding of relief valve element 40. On the other hand, the opening area of the open end of relief port 13 is changed by the outer peripheral surface of valving part 40c depending on the position of relief valve element 40 in the sliding range. Namely, when relief valve element 40 is held at the maximum upper position shown in FIGS. 6 and 8 by the elastic force of valve spring 11, the open end of relief port 13 is completely closed by the outer peripheral surface of valving part 40c. On the other hand, when relief valve element 40 is positioned slightly below the maximum upper position as shown in FIGS. 7 and 9, relief port 13 is opened by valving part 40c so that the opening area of relief port 13 is controlled to a small value, and relief port 13 and return passage 41 are hydraulically connected to each other via annular passage 40d.

Pilot valve element 50 is of a spool-valve type similar to relief valve element 40, and includes a pressure-receiving part 50a, a valve shaft 50b, a valving part 50c, and an annular passage 50d. Pressure-receiving part 50a has a disc-shape facing the supply port 33. Valving part 50c has a cylindrical shape having a bottom, and is integrally coupled to pressure-receiving part 50a via valve shaft 50b at the center. Annular passage 50d is formed in the outer periphery of valve shaft 50b. Pilot valve element 50 is biased constantly toward supply port 33 by the elastic force of valve spring 32.

The peripheral portion of the upper side portion of cylinder 30 is formed with a downstream portion 51a of a branch port 51 branched from back pressure passage 15. The open end of discharge port 34 is located on the lower side of downstream end 51a in the longitudinal direction of cylinder 30.

Signal passage 29 has an end connected to feedback passage 2a and another end connected to supply port 33.

Figure 6:
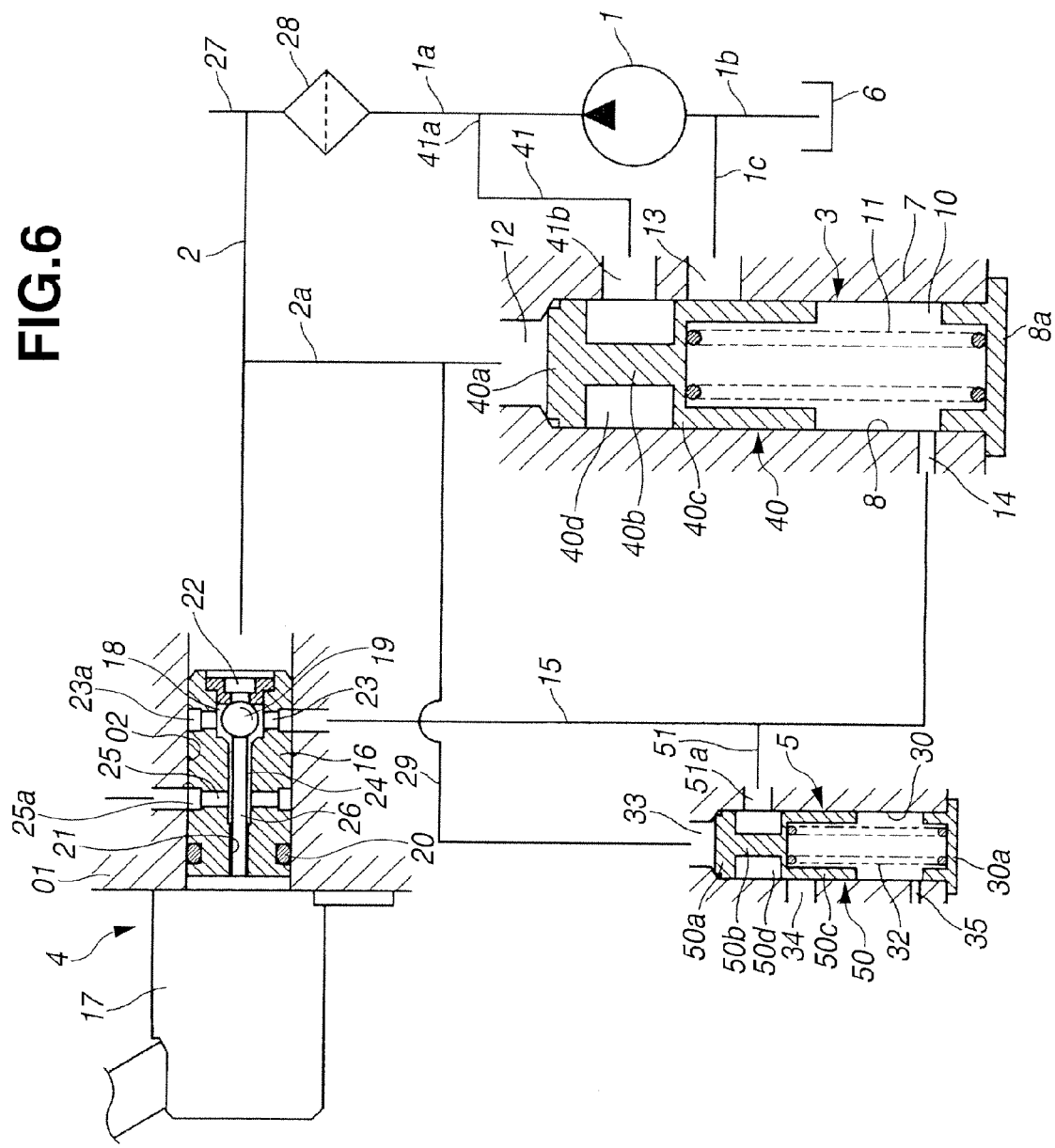
FIG. 6 is a schematic diagram showing an oil pump system including an oil pump and a relief pressure control apparatus according to a second embodiment of the present invention.
Figure 7:
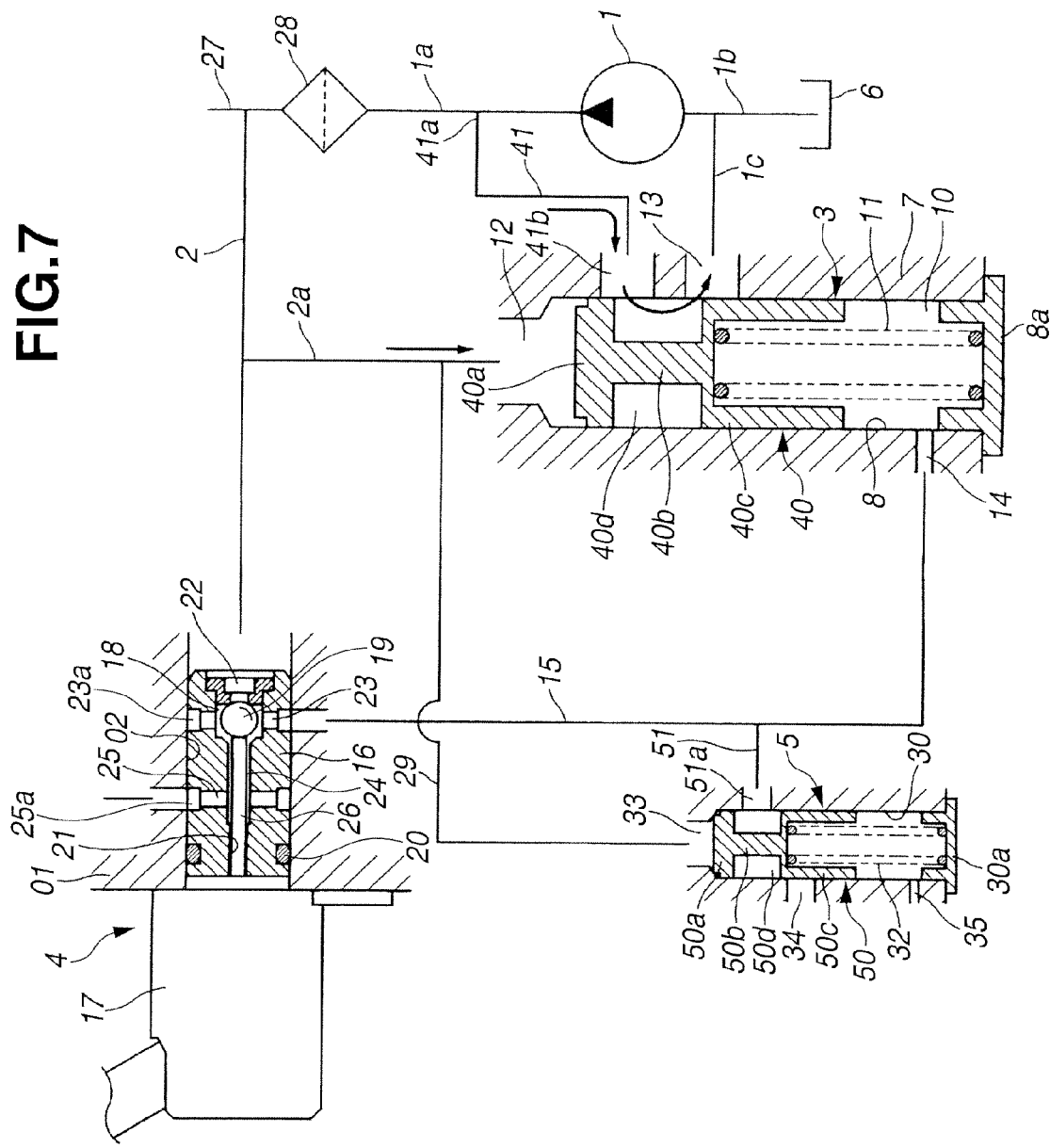
FIG. 7 is a schematic diagram showing the oil pump system of FIG. 6 in a state where an electromagnetic switching valve is energized.
Figure 8:
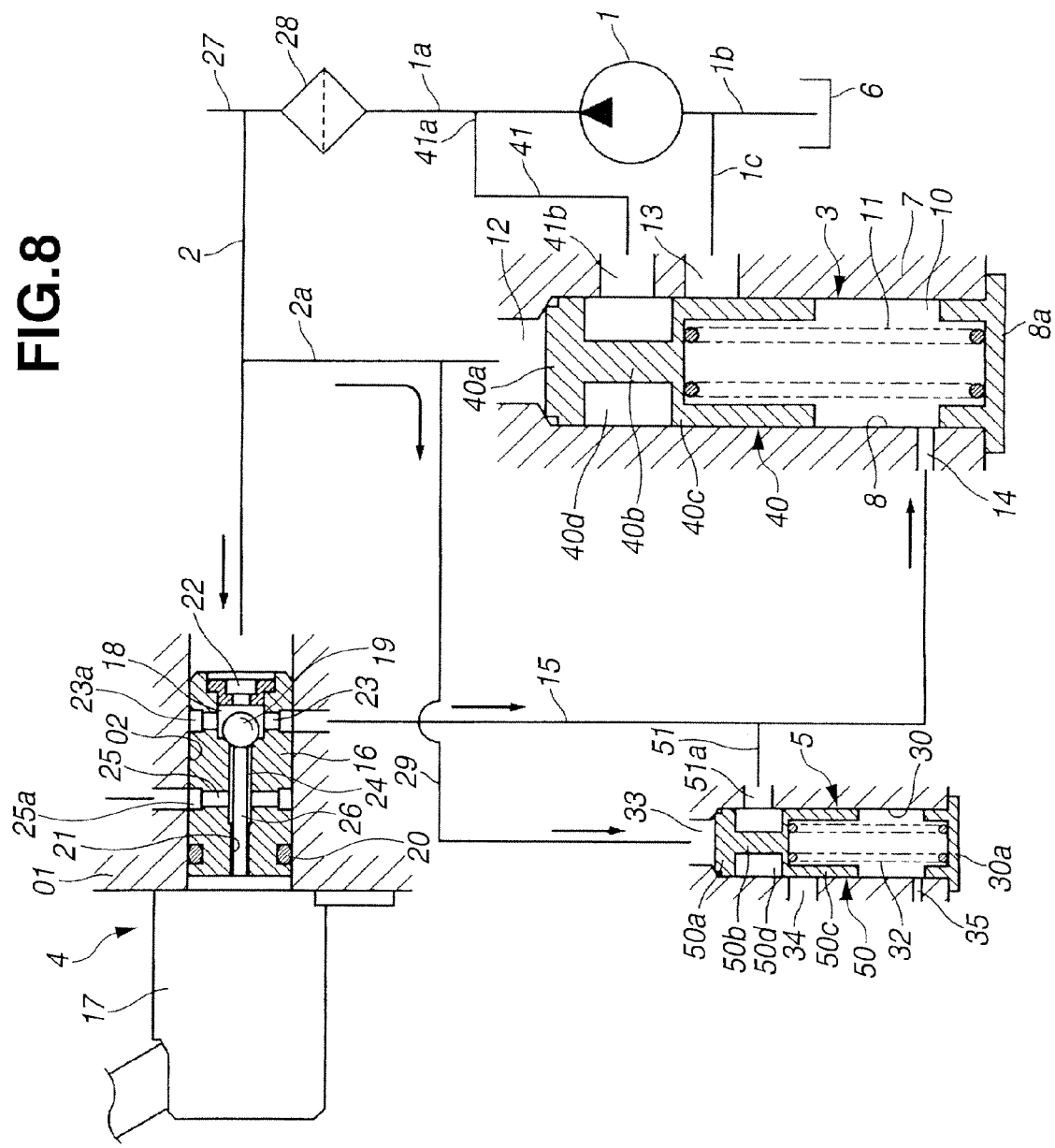
FIG. 8 is a schematic diagram showing the oil pump system of FIG. 6 in a state where the electromagnetic switching valve is de-energized.
Figure 9:
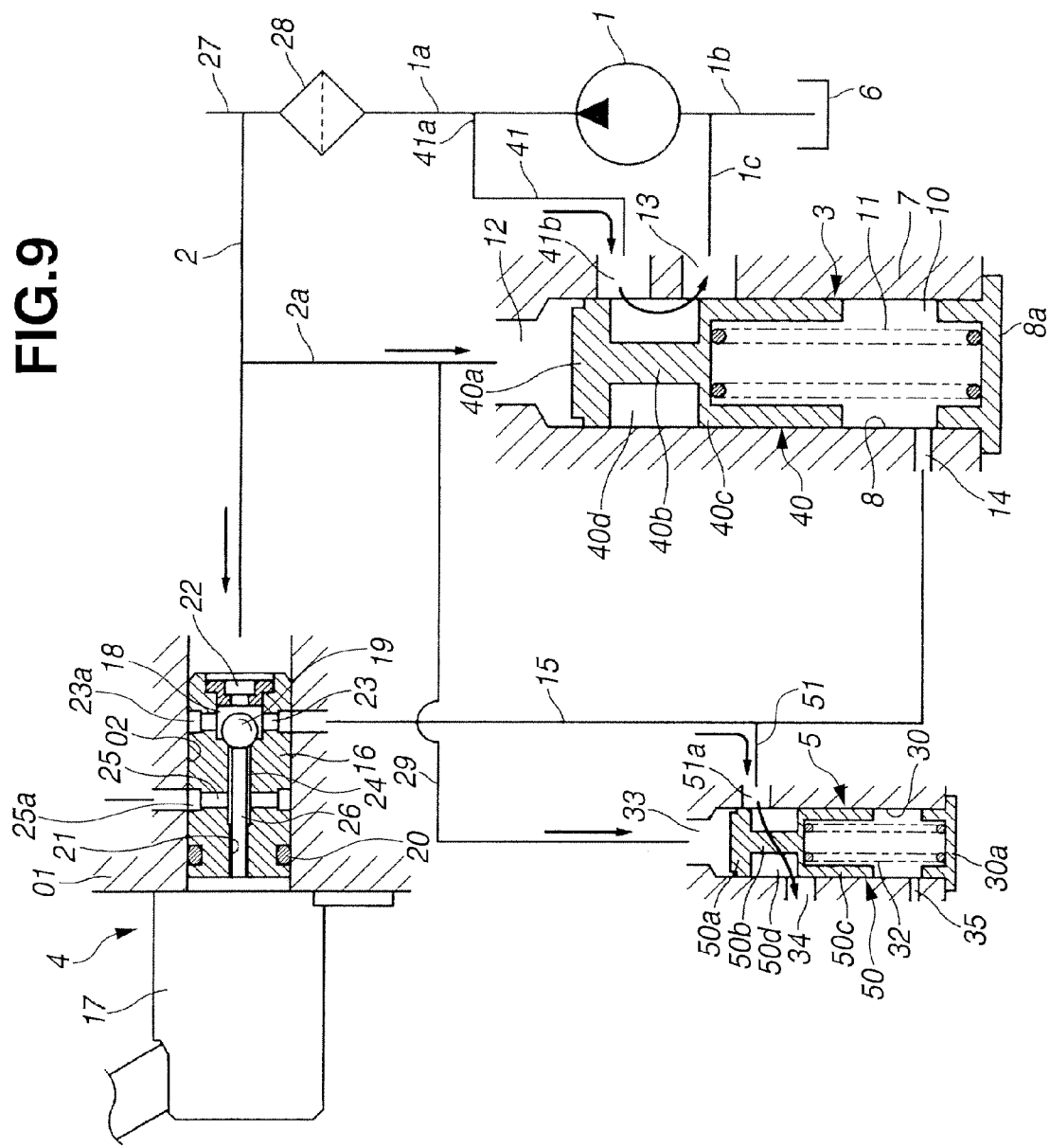
FIG. 9 is a schematic diagram showing the oil pump system of FIG. 6 in a state where the electromagnetic switching valve is held de-energized.

As shown in FIGS. 6 to 8, when the pump discharge pressure supplied via branch passage 2, feedback passage 2a and signal passage 29 is lower than or equal to a predetermined value, pilot valve element 50 is held at the maximum upper position by the elastic force of valve spring 32 so that the downstream end 51a of branch port 51 is closed. On the other hand, when the supplied pump discharge pressure is higher than the predetermined value, pilot valve element 50 is moved downward to open the downstream end 51a of branch port 51, and thereby allow fluid communication between branch port 51 and discharge port 34 through annular passage 50d as shown in FIG. 9. Namely, the cross-sectional area of fluid communication between branch port 51 and discharge port 34 is changed depending on the oil pressure in supply port 33.

Breather port 35 has an end open to the lower end portion of cylinder 30.

<Operation of Second Embodiment> The following describes operation of the oil pump with the relief pressure control apparatus according to the second embodiment. When the internal combustion engine is being started or operating at low speed, oil pump 1 is rotated by the internal combustion engine, and the electromagnetic coil of electromagnetic switching valve 4 is energized by the control unit. Accordingly, as shown in FIG. 6, push rod 26 is caused to press ball valve element 19 into pressing contact with the annular seat portion to close the open-ended hole 22, and allow fluid communication between back pressure passage 15 and drain hole 25 through back pressure holes 23 and tubular passage 24. By this action, the internal pressure of back pressure chamber 10 of relief valve 3 is lowered, so that relief valve element 40 is biased toward the maximum upward position in valve accommodation chamber 8 only by the elastic force of valve spring 11, and the upper wall 40a is brought into pressing contact with a stepped annular surface of valve accommodation chamber 8, and the relief port 13 is closed by the peripheral wall 40c of relief valve element 40.

When the engine rotational speed has risen with continuation of the energization of the electromagnetic coil so that the pump discharge pressure has reached the first oil pressure value P1, the pump discharge pressure applied to the pressure-receiving part 40a via discharge passage 1a, oil filter 28, branch passage 2, and feedback passage 2a has become high and thereby cause relief valve element 40 to move downward by a certain amount against the elastic force of valve spring 11. Under this condition, the outer peripheral surface of peripheral wall 40c of relief valve element 40 gradually increases the opening area of relief port 13 from zero toward the maximum position. By this action, an excess amount of working oil flowing from discharge passage is through return passage 41 to annular passage 40d is returned to suction passage 1b through relief port 13 and relief passage 1c. Accordingly, under this condition, as indicated by a broken line in FIG. 10, the pump discharge pressure is prevented from rising significantly above the first oil pressure value P1, so that the pump discharge pressure is suitably regulated to a substantially flat characteristic.

When the internal combustion engine shifts thereafter into a state where high oil pressure is requested with increase of the engine speed (or pump rotational speed) and oil temperature, the control unit senses this condition, and then de-energizes the electromagnetic coil of electromagnetic switching valve 4. By this action, as shown in FIG. 8, push rod 26 is caused to move rearward along with the movable plunger, to release the pressing contact between ball valve element 19 and the valve seat portion, so that the open-ended hole 22 is opened by ball valve element 19, to allow fluid communication between branch passage 2 and back pressure passage 15, and close the tubular passage 24. Accordingly, the pump discharge pressure is supplied to back pressure chamber 10 of relief valve 3 through branch passage 2 and back pressure passage 15, so that the internal pressure of back pressure chamber 10 becomes high. On the other hand, the pump discharge pressure is applied to pressure-receiving part 40a of relief valve element 40 through feedback passage 2a and introduction port 12. In this way, relief valve element 40 is applied with substantially identical oil pressures on upper and lower sides. As a result, relief valve element 40 is moved upward by the elastic force of valve spring 11, so that the outer peripheral surface of peripheral wall 40c of relief valve element 40 closes the open end of relief port 13 and the pressure-receiving part 40a of relief valve element 40 closes the open end of introduction port 12.

Figure 10:
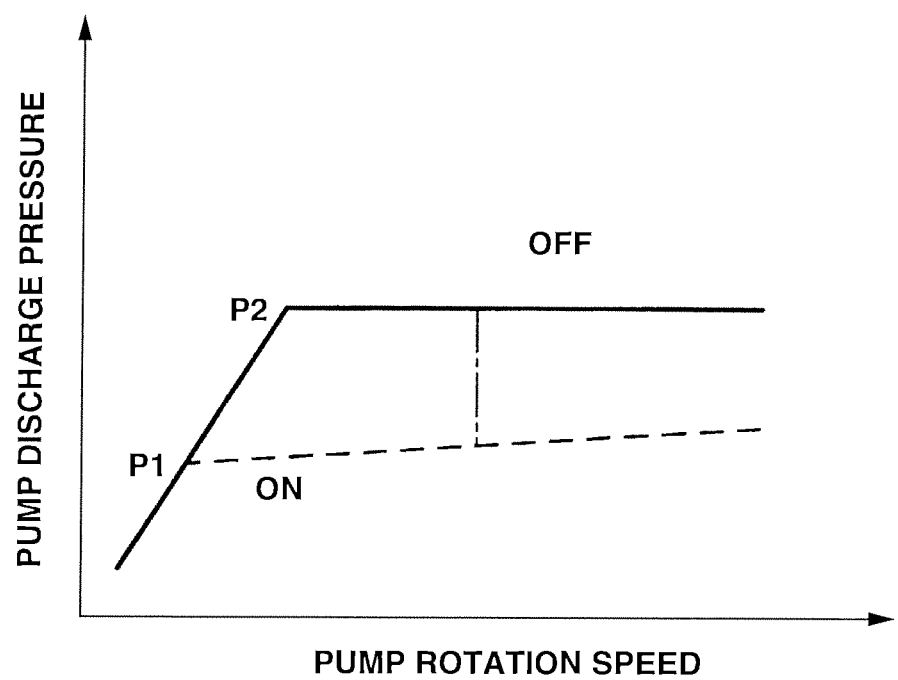
FIG. 10 is a characteristic diagram showing a relationship between a pump discharge pressure and a pump rotational speed (or engine rotational speed) in the oil system of FIG. 6.

When the engine speed further rises from that condition, the high pump discharge pressure is supplied to the back pressure chamber 10 with the relief valve element 40 maintained at the maximum top position shown in FIG. 8, so that the pump discharge pressure exceeds the first oil pressure value P1 and reaches the second oil pressure value P2 as shown in FIG. 10.

When the engine speed further rises and the pump discharge pressure exceeds the second oil pressure value P2, the pump discharge pressure is applied to pilot valve element 50 through signal passage 29, to cause pilot valve element 50 to move downward against the elastic force of valve spring 32. This action allows valving part 50c to open the open end of discharge port 34, and thereby allows fluid communication between the downstream end 51a of branch port 51 and discharge port 34 via branch port 51d. Accordingly, the pump discharge pressure in back pressure passage 15 is drained to the outside, to adjust the oil pressure in back pressure passage 15.

When discharge port 34 is closed by pilot valve element 50 by the elastic force of valve spring 32, the oil pressures in the upstream side and downstream side of electromagnetic switching valve 4 become equal to each other. However, when discharge port 34 is opened by pilot valve element 50 by the pump discharge pressure at the second oil pressure value P2, the oil pressure is drained from discharge port 34 so that the oil pressure in back pressure passage 15 is reduced by a pressure loss due to a flow resistance in electromagnetic switching valve 4, for example, at open-ended hole 22. As a result, relief valve 3 moves downward against the elastic force of valve spring 11 to reach the condition shown in FIG. 9.

The second oil pressure value P2 is set to obtain an oil pressure for lubrication of the crankshaft when the engine is operating at high speed, or an oil pressure for injecting an oil jet to the engine piston.

In this way, pilot valve 5 adjusts the oil pressure in a portion of the back pressure passage 15 downstream of electromagnetic switching valve 4 (identical to the back pressure of relief valve 3) so that the oil pressure in main oil gallery 27 becomes equal to the second oil pressure value P2. Accordingly, the oil pressure is set to a substantially flat characteristic from the point of P2 as indicated by a solid line in FIG. 10. Namely, back pressure chamber 10 receives supply of the pump discharge pressure that is obtained after passing through the oil filter 28 and the throttled open-ended hole 22, and then being drained through branch port 51 and discharge port 34, so that the pump discharge pressure is prevented from rising above the second oil pressure value P2, and thereby becomes flat.

When the energization of electromagnetic switching valve 4 is switched from on-state to off-state while the engine speed is increasing, the oil pump system shifts from the characteristic indicated by the broken line to the characteristic indicated by the solid line as indicated by a short dashed long dashed line in FIG. 10.

The other configuration and operation of the second embodiment is similar to that of the first embodiment. The second embodiment also serves to stabilize behavior of ball valve element 50 and thereby achieve a precise relief pressure control, and enhance the pumping efficiency.

Also in the second embodiment, pilot valve 5 may be implemented by an electromagnetic valve or the like, if pilot valve 5 is configured to adjust or relieve the oil pressure in back pressure passage 15.

The first and second embodiments may be modified variously. For example, relief valve 3 and pilot valve 5 may be implemented by another combination than the shown combinations of the first and second embodiments.

Oil pump 1 may be of another type than the trochoid type, such as a vane type or an external gear type.

The relief pressure control apparatus may be formed integrally with the housing of oil pump 1 or provided separately from the housing of oil pump 1.

The entire contents of Japanese Patent Application 2013-217150 filed Oct. 18, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil pump for an internal combustion engine, comprising:
 a relief valve including a back pressure chamber, and configured to adjust a pump discharge pressure depending on a differential pressure between the pump discharge pressure and a back pressure chamber pressure, wherein the pump discharge pressure is a discharge pressure of the oil pump, and wherein the back pressure chamber pressure is an oil pressure in the back pressure chamber;
 an electromagnetic switching valve including:
  an oil passage;
  a valve seat portion;
  a ball valve element; and a movable member configured to be moved electromagnetically, and bring the ball valve element selectively into a state pressed onto the valve seat portion and into a state non-pressed onto the valve seat portion, to selectively close and open the oil passage;

wherein the electromagnetic switching valve is configured to selectively supply the pump discharge pressure to the back pressure chamber of the relief valve and drain the back pressure chamber of the relief valve by selectively opening and closing the oil passage; and a pilot valve disposed downstream of the electromagnetic switching valve, and configured to operate upon receipt of at least one of the pump discharge pressure and the back pressure chamber pressure, and control an oil pressure supplied to the back pressure chamber of the relief valve, wherein:

the electromagnetic switching valve is configured to control the back pressure chamber pressure by selectively allowing and preventing fluid communication between a discharge passage and a back pressure passage by operating the ball valve element depending on an operating state of the internal combustion engine;

the pump discharge pressure is applied to the discharge passage; and the back pressure passage includes an end open to the back pressure chamber of the relief valve, and wherein the pilot valve includes:

a supply port configured to receive supply of the pump discharge pressure from the discharge passage directly or through the back pressure passage;

a discharge port configured to discharge the supplied pump discharge pressure;

a cylinder, wherein the supply port includes an end open to the cylinder, and wherein the discharge port includes an end open to the cylinder;

a pilot valve element slidably mounted in the cylinder, and including an end portion including a pressure-receiving surface configured to receive the supplied pump discharge pressure, and configured to vary an opening area of the discharge port by sliding in accordance with the supplied pump discharge pressure; and a biasing member configured to bias the pilot valve element in a direction to close the discharge port.

2. The oil pump as claimed in claim 1, wherein the pilot valve is configured to vary a cross-sectional area of fluid communication between the supply port and the discharge port by sliding of the pilot valve element.

3. The oil pump as claimed in claim 1, wherein the pilot valve is configured to vary a cross-sectional area of fluid communication between the back pressure passage and the discharge port by sliding of the pilot valve element.

4. The oil pump as claimed in claim 1, further comprising an oil filter disposed in a discharge passage and upstream of the relief valve and the electromagnetic switching valve.

5. A relief pressure control apparatus for an oil pump, comprising:

a relief valve including:

a valve accommodation chamber, wherein an introduction port includes an end open to the valve accommodation chamber, and wherein a drain port includes an end open to the valve accommodation chamber, and wherein the introduction port is configured to introduce a pump discharge pressure through a discharge passage, and wherein the pump discharge pressure is a discharge pressure of the oil pump, and wherein the drain port is configured to drain the introduced pump discharge pressure;

a relief valve element slidably mounted in the valve accommodation chamber, and including a first end side configured to receive the pump discharge pressure through the introduction port, and configured to vary an opening area of the drain port by sliding in accordance with the received pump discharge pressure;

a biasing member configured to bias the relief valve element in a direction to close the drain port;

a back pressure chamber formed in the valve accommodation chamber at a second end side of the relief valve element; and a back pressure passage including an end open to the back pressure chamber;

an electromagnetic switching valve hydraulically connected between the discharge passage and the back pressure passage, the electromagnetic switching valve including:

an open-ended hole configured to receive supply of the pump discharge pressure from the discharge passage;

a back pressure hole configured to supply the pump discharge pressure from the open-ended hole to the back pressure passage;

a ball valve element configured to selectively open and close the open-ended hole; and a solenoid configured to operate the ball valve element; and a pilot valve hydraulically connected between the electromagnetic switching valve and the back pressure chamber of the relief valve, and configured to operate upon receipt of at least one of the pump discharge pressure and a back pressure chamber pressure, wherein the back pressure chamber pressure is an oil pressure in the back pressure chamber of the relief valve, and control an oil pressure supplied to the back pressure chamber of the relief valve, wherein:

the relief valve element has a cylindrical shape including a bottom;

the valve accommodation chamber has a cylindrical shape;

the open end of the introduction port is located at a longitudinal end portion of the valve accommodation chamber; and the open end of the drain port and the open end of the back pressure passage are located at a peripheral portion of the valve accommodation chamber, and arranged in a longitudinal direction of the valve accommodation chamber, and formed to extend in a radial direction of the valve accommodation chamber.

6. The relief pressure control apparatus as claimed in claim 5, wherein the electromagnetic switching valve is configured to control the back pressure chamber pressure by selectively allowing and preventing fluid communication between the discharge passage and the back pressure hole by operating the ball valve element depending on an operating state of an internal combustion engine.

7. The relief pressure control apparatus as claimed in claim 6, wherein the pilot valve includes:

a supply port configured to receive supply of the pump discharge pressure from the discharge passage directly or through the back pressure passage;

a discharge port configured to discharge the supplied pump discharge pressure;

a cylinder, wherein the supply port includes an end open to the cylinder, and wherein the discharge port includes an end open to the cylinder;

a pilot valve element slidably mounted in the cylinder, and including an end portion including a pressure-receiving surface configured to receive the supplied pump discharge pressure, and configured to vary an opening area of the discharge port by sliding in accordance with the supplied pump discharge pressure; and a biasing member configured to bias the pilot valve element in a direction to close the discharge port.

8. The relief pressure control apparatus as claimed in claim 6, wherein the pilot valve includes:

a supply port configured to receive supply of the pump discharge pressure from the discharge passage directly or through the back pressure passage;

a branch port hydraulically connected to the back pressure passage;

a discharge port configured to discharge an oil pressure supplied from the branch port;

a cylinder, wherein the supply port includes an end open to the cylinder, and wherein the branch port includes an end open to the cylinder, and wherein the discharge port includes an end open to the cylinder;

a pilot valve element slidably mounted in the cylinder, and including an end portion including a pressure-receiving surface configured to receive the supplied pump discharge pressure, and configured to vary a cross-sectional area of fluid communication between the branch port and the discharge port by sliding in accordance with the supplied pump discharge pressure; and a biasing member configured to bias the pilot valve element in a direction to close the discharge port.

9. The relief pressure control apparatus as claimed in claim 5, wherein:

the bottom includes a pressure-receiving surface at a longitudinal end of the relief valve element; and the pressure-receiving surface is applied with the introduced pump discharge pressure.

10. The relief pressure control apparatus as claimed in claim 5, wherein:

the pilot valve includes:

a supply port configured to receive supply of the pump discharge pressure from the discharge passage directly or through the back pressure passage;

a branch port hydraulically connected to the back pressure passage;

a discharge port configured to discharge an oil pressure supplied from the branch port;

a cylinder, wherein the supply port includes an end open to the cylinder, and wherein the branch port includes an end open to the cylinder, and wherein the discharge port includes an end open to the cylinder;

a pilot valve element slidably mounted in the cylinder, and including an end portion including a pressure-receiving surface configured to receive the supplied pump discharge pressure, and configured to vary a cross-sectional area of fluid communication between the branch port and the discharge port by sliding in accordance with the supplied pump discharge pressure; and a biasing member configured to bias the pilot valve element in a direction to close the discharge port;

the pilot valve element has a cylindrical shape including a bottom;

the cylinder has a cylindrical shape;

the open end of the supply port is located at a longitudinal end portion of the cylinder; and the open end of the discharge port and the open end of the branch port are arranged in a longitudinal direction of the cylinder, and formed to extend in a radial direction of the cylinder.

11. The relief pressure control apparatus as claimed in claim 5, wherein:

the electromagnetic switching valve includes an accommodation part therein;

the accommodation part is disposed at a distal end portion of the electromagnetic switching valve, and has a cylindrical shape, and accommodates the ball valve element movably;

the open-ended hole is formed in a distal end of the accommodation part in a longitudinal direction of the electromagnetic switching valve;

the back pressure hole is disposed at a peripheral portion of the accommodation part, and extends in a radial direction of the accommodation part;

the solenoid includes a push rod inserted in the accommodation part; and the push rod is configured to cause the ball valve element to move forward and rearward selectively to selectively close and open the open-ended hole.

12. The relief pressure control apparatus as claimed in claim 11, wherein the electromagnetic switching valve is configured to maintain the open-ended hole closed by the ball valve element at start of the oil pump.

13. The relief pressure control apparatus as claimed in claim 11, wherein:

energization of the solenoid of the electromagnetic switching valve is controlled based on parameters of an internal combustion engine; and the parameters include an oil temperature, a water temperature, a rotational speed, and a load.

14. The relief pressure control apparatus as claimed in claim 11, wherein:

the electromagnetic switching valve includes a drain hole;

the drain hole is located at a portion of the accommodation part opposite to the open-ended hole; and the drain hole is configured to allow fluid communication between the back pressure passage and an outside through the back pressure hole, when the open-ended hole is closed by the ball valve element.

* * * * *